United States Patent [19]

Guagliardo

[11] 4,318,833

[45] Mar. 9, 1982

[54] WATER REDUCIBLE COATING COMPOSITIONS OF ACRYLIC-URETHANE POLYMERS

[75] Inventor: Matthew Guagliardo, Bloomfield, N.J.

[73] Assignee: Inmont Corporation, Clifton, N.J.

[21] Appl. No.: 150,466

[22] Filed: May 16, 1980

[51] Int. Cl.³ ............................................. C08L 75/04
[52] U.S. Cl. ................................................. 524/457
[58] Field of Search ................. 260/29.2 TN, 29.6 NR

[56] References Cited

U.S. PATENT DOCUMENTS

| | | | |
|---|---|---|---|
| 2,946,767 | 7/1960 | Gassmann | 260/29.6 NR |
| 2,968,575 | 1/1961 | Mallonee | 106/287 |
| 3,257,476 | 6/1966 | Tobolsky | 260/859 |
| 3,291,859 | 12/1966 | Tobolsky | 260/859 |
| 3,479,310 | 11/1969 | Dieterich | 260/29.2 |
| 3,865,898 | 2/1975 | Tobolsky | 260/859 |
| 4,155,892 | 5/1979 | Emmons | 260/29.2 TN |
| 4,198,330 | 4/1980 | Kaizerman | 260/29.6 R |

*Primary Examiner*—Paul R. Michl
*Attorney, Agent, or Firm*—Michael R. Chipaloski; F. W. Wyman

[57] ABSTRACT

Water reducible coating compositions based on a thermoplastic polymer prepared by polymerizing one or more ethylenically unsaturated monomers in the presence of a water soluble fully reacted polyurethane. The resulting polymer can be coated from solution as a clear film, heat cured, air dried or cross-linked. The coatings, when combined with pigments and metallics, are useful as automotive finishes.

8 Claims, No Drawings

WATER REDUCIBLE COATING COMPOSITIONS OF ACRYLIC-URETHANE POLYMERS

BACKGROUND OF THE INVENTION

1. Field of the Invention

This invention relates to water reducible polymeric coating compositions which can be applied to a variety of substrates, and in particular, to a coating composition that is useful in automotive finishes.

2. Description of the Prior Art

Polyurethanes constitute a broad class of polymeric materials having a wide range of physical characteristics. The polymers are usually produced through the interaction of a polyfunctional isocyanate with a polyfunctional chemical compound having an active hydrogen in its structure.

In U.S. Pat. Nos. 3,865,898, 3,257,476 and 3,291,859 there are disclosed block copolymers and processes for forming them. In U.S. Pat. Nos. 3,257,476 and 3,291,859 the block copolymers are of an A-B-A structure. These patents teach a synthesis route to the preparation of block copolymers wherein one block is a vinyl copolymer and the other block can generally be referred to as a polyurethane. In the general scheme of synthesis as taught by these patents, a prepolymer is formed by reacting an aromatic diisocyanate with a polymeric material having functional groups with active hydrogen to form an "isocyanate-capped" prepolymer. The prepolymer is then usually reacted with tert-butyl hydroperoxide, a cumene hydroperoxide, or a dual-functional free radical initiator to form a peroxycarbamate which has reactive sites capable of initiating the polymerization of ethylenically-unsaturated monomers to form a block copolymer.

Water dispersible polyurethanes are also known in the art. For example, U.S. Pat. No. 2,968,575 to Mallonee discloses emulsifying NCO-containing prepolymers in a solution of diamine and water with the aid of detergents. A chain lengthening reaction takes place as water and diamine diffuse into the droplets of emulsion and react with the isocyanate.

There have also been suggestions in the prior art to prepare fully reacted polyurethanes in organic solvent with internally contained salt groups which permit the polyurethane to be dispersed in water. For example, U.S. Pat. No. 3,479,310 to Dieterich et al, discloses dispersing a fully chain extended, NCO-free polyurethane having internally contained ionic salt groups in water without the aid of detergent.

I have now found that a water reducible fully reacted polyurethane of the type described in the aforementioned patents can be produced which in turn can be used for the in situ polymerization with one or more ethylenically unsaturated monomers to form a water reducible acrylic-urethane polymer. The acrylic-urethane polymer can be coated from solution to form a tough, durable coating that can be air dried, heat cured or cross-linked, and has particular utility, when combined with pigments and metallics, in automotive finishes.

SUMMARY OF THE INVENTION

It has now been found that novel water reducible storage stable coating compositions comprising an acrylic-urethane polymer composition can be formed by the in situ polymerization of one or more ethylenically unsaturated monomers in the presence of a fully reacted water-soluble polyurethane. The acrylic-urethane polymer can be coated from solution as a clear film, air dried, heat cured or cross-linked, and has particular utility, when combined with pigments and metallics, as an automotive finish.

DETAILED DESCRIPTION OF THE INVENTION

The present invention is directed to a water reducible storage stable coating composition comprising a polymer of (a) a fully reacted water soluble polyurethane, and
(b) one or more ethylenically unsaturated monomers.

By storage stable I mean that the coating compositions are stable for an extended period of time (one year or more) without viscosity change or separation from an aqueous dispersion.

The fully reacted water-soluble polyurethane composition (a), in which the in situ polymerization of one or more ethylenically unsaturated monomers is effected, is formed by the reaction of a diisocyanate component with a polyol and a compound containing an acid salt group. Preferred polyurethanes are water soluble or water reducible polyurethane compositions.

The diisocyanate components which are useful according to this invention include those conventionally used in preparing polyurethane resins and include for instance toluene diisocyanates, such as the 2,4- and 2,6-isomers and their mixtures, 1,5 naphthylene diisocyanate, p-phenylene diisocyanate, 3,3'-dimethyl-4,4'-diphenylmethane diisocyanate and 4,4'-diphenylmethane diisocyanate.

Preferred diisocyanates are the aliphatic type since it has been found that these provide better color stability in the finished coating. Examples include isophorone diisocyanate, 1,6-hexamethylene diisocyanate and methylcyclohexylene diisocyanate. Mixtures of diisocyanates can also be employed. An especially preferred diisocyanate is a cycloalkyl-substituted diisocyanate designated as bis (4-isocyanatocyclohexyl)methane and having the structure

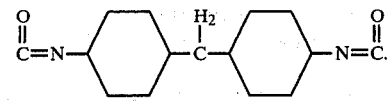

This diisocyanate is commercially available from E. I. duPont Chemical Company and referred to as Hylene W.

The polyols can be either low or high molecular weight materials and preferably include a mixture of the two and in general will have average hydroxyl values as determined by ASTM designation E-222-67, Method B, between about 1000 and 10, and preferably between about 500 and 50.

The low molecular weight diols useful in the instant invention are known in the art. Such materials include aliphatic polyols, particularly alkylene polyols containing from 2 to 18 carbon atoms. Specific examples of low molecular weight diols include ethylene glycol, 1,4 butane diol and 1,6 hexanediol, 2,2 di (hydroxymethyl) propionic acid, as well as cycloaliphatic polyols such as 1,2-cyclohexanediol and cyclohexane dimethanol.

Where flexible and elastomeric properties are desired, the polyurethane should preferably contain at least a portion of a higher molecular weight polymeric polyol.

Such a polymeric polyol should be predominantly linear (that is, absence of trifunctional or higher functionality ingredients) to avoid gelling of the resultant polymeric product and should have a hydroxyl value of 200 or less, preferably within the range of about 150-30.

The most suitable polymeric polyols include polyaklylene ether polyols including thio ethers, polyester polyols including polyhydroxy polyesteramides and hydroxyl-containing polycaprolactones.

Any suitable polyalkylene ether polyol may be used including those which have the following structural formula:

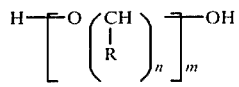

where the substituent R is hydrogen or lower alkyl including mixed substituents, and n is typically from 2 to 6 and m is from 2 to 100 or even higher. Included are poly(oxytetramethylene) glycols, poly(oxyethylene) glycols and polypropylene glycols.

Polyester polyols can also be used as a polymeric polyol component in the practice of the invention. The polyester polyols can be prepared by the polyesterification of organic polycarboxylic acids or anhydrides thereof with organic polyols. Preferably, the polycarboxylic acids and polyols are aliphatic or aromatic dibasic acids and diols.

Besides polyester polyols formed from polybasic acids and polyols, polycaprolactone-type polyesters can also be employed. These products are formed from the reaction of a cyclic lactone such as epsilon-caprolactone with a polyol or a hydroxy acid.

The higher polymeric polyol component is preferably combined with low molecular weight polyol described above. It has been found that by blending high and low molecular weight polyols, optimum properties can be obtained in the resultant polyurethane. Preferably, the polymeric polyol is the major component, being present in an amount of about 25 to 95 percent by weight based on total weight of the polyol used to prepare the polyurethane, the remainder being low molecular weight polyol.

Air dry coatings can be prepared by the incorporation of an olefinic compound such as a drying oil derivative that contains active hydrogen. Among the olefinic derivatives that can be employed are alcohols and carboxylic acids that contain at least one olefinic double bond and at least 4 carbon atoms. Olefinic alcohols that can be used include oleyl alcohol, linoleyl alcohol, linolenyl alcohol and the like. Olefinic fatty acids that can be used include 2-butenoic acid, 3-pentenoic acid, linoleic acid and the like. It is particularly advantageous for purposes of economy to employ mixtures of acids, particularly those derived from natural sources such as dehydrated castor oil, linseed oil, safflower oil, soybean oil and the like.

The polyurethane can be terminated with a compound containing at least one reactive functional (capping) group. The functional group can contain an active hydrogen atom that is displaced during the reaction with the isocyanate. These active hydrogen atoms are characterized by a positive Zerewitinoff test. The most common functional groups (capping agents) containing these active hydrogen atoms are

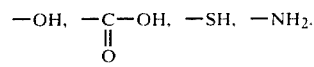

Some of the more common examples of capping agents are:

mono functional alcohols methanol, ethanol, isopropanol polyfunctional -OH containing compounds 1,4 butanediol, ethylene glycol, propylene glycol, trimethylol propane, trimethylol ethane mono functional organic acids formic acid, acetic acid difunctional organic acids succinic acid, glutaric acid difunctional amines 1,2-propylene diamine, ethylene diamine mono functional amines propylamine, butyl amine The especially preferred compounds are the difunctional hydroxyl containing compounds.

The acids that are employed in the invention are readily available. They can be prepared from an aldehyde that contains at least two hydrogens in the alpha position. Such aldehydes are reacted in the presence of a base catalyst with two equivalents of formaldehyde to form a 2.2-hydroxymethyl aldehyde. The aldehyde is then gently oxidized to the acid by known procedures. The acids that are employed in the invention can be represented in simplification by Formula I:

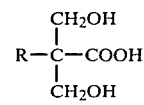

wherein R represents hydroxymethyl, hydrogen, or alkyl of up to 20 carbon atoms and preferably up to 8 carbon atoms.

Specific illustrative examples of acids that are employed in the invention include 2,2-di(hydroxymethyl) acetic acid, 2,2.2-tri(hydroxymethyl) acetic acid, 2,2-di(hydroxymethyl) propionic acid, 2,2-di(hydroxymethyl) butyric acid, 2,2-di(hydroxymethyl) pentanoic acid, and the like. The preferred acid is 2,2-di(hydroxymethyl) propionic acid. The 2,2-di(hydroxymethyl) propionic acid functions as both a solubilizing site as well as a low molecular weight diol.

Besides acid salt groups which are anionic and are preferred, the polyurethane can contain cationic salt groups. The polyurethane can be prepared with reactants containing the cationic salt group, or as is more normally the case, polyurethanes containing suitable precursors can be converted to the cationic salt by adding a neutralizing agent to the polymer. Compounds which contain at least one hydrogen atom reactive with the isocyanate and at least one group capable of cationic salt formation can be used.

Examples of classes of materials which can be used are the following: compounds which have acid neutralized primary or secondary amino groups; basic tertiary amino groups; tertiary phosphino groups which can be neutralized with acid or quaternized with quaternizing agents; compounds which contain halogen atoms capable of quaternizing reactions; compounds which contain epoxy groups which are reactive with acid plus amines or phosphines to form acid salt or quaternary groups, and which are reacted with acids plus sulfides to form acid salts or ternary sulfonium groups.

A ratio of from about 2 to about 7 parts ethylenically unsaturated monomer to 1 part fully reacted polyurethane can be used to prepare the copolymers according to this invention. An especially preferred ratio is 3 parts ethylenically unsaturated monomer to 1 part fully reacted polyurethane.

By ethylenically unsaturated monomer I mean any of the known polymerizable ethylenically unsaturated monomers characterized by the presence therein of at least one polymerizable ethylenic group. These monomers are well known in the art and include the hydrocarbon monomers such as butadiene, isoprene, styrene, alpha-methyl styrene and the like; substituted styrenes such as chlorostyrene, dichlorostyrene, bromostyrene, p-vinylphenyl phenyl oxide and the like; the acrylic and substituted acrylic monomers such as methyl methacrylate, cyclohexyl methacrylate, benzyl methacrylate, methyl, ethyl and butyl acrylate, phenyl acrylate, phenyl methacrylate, alphachloroacrylonitrile and the like; the vinyl esters and vinyl ethers such as vinyl acetate, vinyl acrylate, vinyl methacrylate, vinyl propyl ethers, vinyl butyl ethers and the like; acrylic acid and methacrylic acid; other water soluble monomers such as hydroxy ethyl acrylate or methacrylate, hydroxy propyl acrylate or methacrylate and the like. Any of the known polymerizable monomers can be used and the compounds listed above are illustrative and not restrictive of the monomers suitable for use in this invention.

The ethylenically unsaturated monomers which are preferred in the practice of this invention include the acrylic and substituted acrylic monomers as well as styrene.

Pigments are used in the novel coating composition of this invention in the amounts of 0.1-20.0% pigment volume concentration; preferably, a pigment volume concentration of about 0.1-14% is used. Examples of the great variety of pigments which are used in the novel coating composition of this invention are metallic oxides, preferably titanium dioxide, zinc oxide, and the like, metal hydroxide, metal flakes, chromates, such as lead silica, talc, china clay, organic dyes and lead, iron blues, organic reds, maroons, and the like, organic dyes and lakes, etc.

The novel coating compositions of this invention can be applied to a variety of substrates, for example, wood, glass, and metal, by any of the usual application methods, such as spraying, dipping, flowcoating and brushing. These coatings can be air dried or can be baked, for example, about 10-15 minutes at 125-175 degrees C. The resulting coatings or films can be rubbed or polished in accordance with conventional techniques, if desired, to improve smoothness, gloss or both.

Crosslinking or curing agents may be added. These agents bring about chemical crosslinking after a film is deposited. Examples of suitable curing agents would be aminoplast resins, phenolic resins, organic polyisocyanates which include free as well as masked and blocked isocyanates, and epoxy containing organic materials. The crosslinkers should be compatible with the aqueous resin vehicles described without separation into two layers when mixed.

The dried coatings of the compositions of this invention are characterized by increased freedom from water spotting and have excellent craze resistance in combination with outstanding durability and gloss retention. Coatings of this invention also have good gasoline resistance and improved adhesion.

DESCRIPTION OF PREFERRED EMBODIMENTS

The following specific examples are given to further illustrate the invention. In the examples and elsewhere, the "parts" are by weight unless otherwise stated.

EXAMPLE I

Preparation of Water Reducible Polyurethane

A water reducible polyurethane was prepared as follows: 983.6 g Witco Formez 1212-29 (0.567 mole), 90.8 g dimethylol propionic acid (0.672 mole) and 390.1 g (1.487 mole) Hylene W were reacted in a solvent mixture of 169.4 g diethyl Carbitol ® and 69.6 g methyl ethyl ketone. The reaction mixture was held at 100° C. for 1¾ hrs., after which time 73 g (0.548 mole) trimethylol propane was added. The reaction mixture was held an additional hour at about 97° C. The above polyurethane was neutralized and diluted with water as follows: 44.9 g dimethylamino ethanol (enough to neutralize 75% of the available carboxyl groups) and 225 g ethylene glycol monobutyl ether were added to the polyurethane at about 85° C. The reaction mixture was allowed to stir 10 minutes, then 2360 g water were added over ½ hour to dilute the resin. The resulting polyurethane had a solids of 34.5%, a viscosity of 700 cps and a pH of 7.35.

EXAMPLE II

Preparation of Urethane/Acrylic Dispersion

A urethane/acrylic dispersion was prepared based on the following formula:

| Item | Wt. (g) |
| --- | --- |
| 1. water reducible polyurethane (Ex. I) | 580.0 |
| 2. deionized water | 140.0 |
| 3. butyl acrylate | 65.0 |
| 4. methyl methacrylate | 25.0 |
| 5. hydroxyethyl methacrylate | 10.0 |
| 6. t-butyl peroctoate | 2.0 |
| 7. t-butyl peroctoate | 0.5 |
| 8. ethylene glycol monobutyl ether | 10.0 |

Items 1 and 2 were charged to a 1 liter flask. Monomer mixture of items 3 through 6 was prepared and 10% of the mixture was added to the flask. The contents of the flask was heated to about 85° C., then the remainder of the monomer mix was added over 1¼ hr. The reaction was held at reflux, about 90° C., for 45 minutes, then item 7 in 8 was added in one minute. The reaction was held an additional one hour, then cooled to room temperature. The final resin had a solids of 36.15%, a urethane/acrylic ratio of 2/1, and a viscosity of 240 cps and was storage stable for over 1 year.

EXAMPLE III

Preparation of Water Reducible Polyurethane

A water reducible polyurethane was prepared similar to Example I, except the polyol used was based on azelaic acid-neopentyl glycol cyclohexane dimethanol (mole ratio=5.0/3.9/2.1).

The following charge was used to prepare the polyurethane:

| | |
|---|---|
| polyol | 848.34 |
| dimethylol propionic acid | 88.83 |
| Hylene W | 408.0 |
| diethyl Carbitol ® | 157.5 |
| methyl ethyl ketone | 64.8 |
| trimethylol propane | 76.4 |
| ethylene glycol monobutyl ether | 208.44 |
| dimethylamino ethanol | 43.25 |
| water | 2230.0 |

The resulting water soluble polyurethane had a solids of 34.3%, pH 7.25 and viscosity of 800 cps.

EXAMPLE IV

Preparation of Urethane/Acrylic Dispersion

The urethane/acrylic dispersion was prepared similar to Example II except the following weights were used.

| Item | Wt. (grams) |
|---|---|
| 1. water soluble polyurethane (Example III) | 583 |
| 2. deionized water | 185 |
| 3. butyl acrylate | 65 |
| 4. methyl methacrylate | 25 |
| 5. hydroxyethyl methacrylate | 10 |
| 6. t butyl peroctoate | 2.0 |
| 7. t butyl peroctoate | 0.5 |
| 8. ethylene glycol monobutyl ether | 10.0 |

The final resin had a solids of 35.6%, a urethane/acrylic ratio of 2/1, and a viscosity of 140 cps and was storage stable, with no separation, for over 1 year. EXAMPLE V Preparation of Pigmented Coatings Pigmented coatings were formulated using the urethane/acrylic dispersions in Examples II and IV. The following table summarizes the composition of the coatings.

| | A | B | C |
|---|---|---|---|
| Polyurethane/acrylic from Ex. II (36.15%) | 27.8 | | |
| Polyurethane/acrylic from Ex. IV (35.6% TNV) | | 28.2 | |
| Acrylic polymer (39.6% TNV) | | | 8.5 |
| Polyurethane (from Ex. I) | | | 19.44 |
| Cymel ® 325 Resin (80% TNV) (Crosslinker) | 3.75 | 3.75 | 3.75 |
| Univ. Colors UC 1060Q TiO2 disp. (65% TiO2) | 10.04 | 10.04 | 10.05 |

The above coatings were cast onto 4"×6" aluminum test panels using a #70 wire wound rod, allowed to flash at room temperature for ½ hour, then baked at 250° F. for 30 minutes. Coatings A and B gave mar-resistant, flexible (passes OT bend) coatings with 20° gloss readings of 80–82. Sample C, which is a physical blend of a polyurethane and an acrylic resin, gave a coating with a gloss reading of 10.

It should be noted that the polyurethane/acrylic dispersions (Coatings A and B) were stable (no separation or settling noted after 2 weeks), whereas a physical blend (C) of polyurethane and polyacrylic resin separated into two layers after standing overnight. The polyacrylic resin is a copolymer of butyl acrylate/methyl methacrylate/hydroxyethyl acrylate/acrylic acid, which was prepared in a Propasol ® M, Propasol ® P, ethylene glycol monobutyl ether solvent mixture at 66% TNV, neutralized with dimethyl amino ethanol and diluted to about 40% TNV with water.

EXAMPLE VI

Preparation of Air Dry Urethane/Acrylic

To a flask equipped with thermometer, stirrer, reflux condenser, Dean-Stark trap and nitrogen purge was added the following:

| | Weight in Grams |
|---|---|
| Trimethylol propane | 48.0 |
| 2,2-Dimethylolpropionic Acid | 54.0 |
| Soya Fatty Acid | 217.9 |
| Neopentyl Glycol | 16.74 |
| Toluene | 50.0 |

The reaction mixture was heated to 200° C. after which time 35 grams water were removed and the resulting product had an acid number of 53.3.

The reaction product was cooled to below 50° C. and 78.0 grams methyl ethyl ketone were then added. 181.0 grams Hylene W (DuPont) were then added over 5–7 minutes and the mixture was heated back up to ~90° C. Heating was continued an additional 2 hours after which time an isocyanate assay revealed less than 0.1 meg/NCO/g resin. The product was cooled to below 80° C. and a mixture of 27.0 grams dimethylamino ethanol and 1150 grams water was added to neutralize and disperse the polymer. The resulting "Uralkyd" had a solids content of 28.3%.

A urethane acrylic dispersion can be prepared based on the following formula using the procedure described in Example II.

| | Grams |
|---|---|
| 1. water soluble polyurethane (from above) | 706.7 |
| 2. deionized water | 35.0 |
| 3. butyl acrylate | 70.0 |
| 4. methyl methacrylate | 30.0 |
| 5. t butyl peroctoate | 2.0 |
| 6. t butyl peroctoate | 0.5 |
| 7. ethylene glycol monobutyl ether | 10.0 |

I claim:

1. A water reducible storage stable coating composition comprising a polymer of
   (a) about 2 to about 7 parts ethylenically unsaturated monomer, polymerized in the presence of
   (b) one part fully reacted water soluble polyurethane.
2. The coating composition of claim 1 containing pigment in a pigment volume concentration of about 0.1 to 14%.
3. The coating composition of claim 1 in which the ethylenically unsaturated monomer is selected from acrylic and methacrylic monomers.
4. The coating composition of claim 1 wherein the polyurethane is formed from the reaction product of a diisocyanate component selected from the group consisting of isophorone diisocyanate, 1,6-hexamethylene diisocyanate, methylcyclohexylene diisocyanate and bis (4-isocyanateocyclohexyl) methane and a mixture of high and low weight polyols.

5. A water reducible storage stable coating composition comprising a polymer of
   (a) 3 parts acrylic monomer polymerized in the presence of
   (b) 1 part fully reacted water soluble polyurethane.

6. The coating composition of claim 5 containing pigment in a pigment volume concentration of about 0.1 to 14%.

7. The coating composition of claim 5 in which the acrylic monomer is selected from acrylic and methyl methacrylic monomers.

8. The coating composition of claim 5 wherein the polyurethane is formed from the reaction product of a diisocyanate component selected from the group consisting of isophorone diisocyanate, 1,6 hexamethylene diisocyanate, methylcyclohexylene diisocyanate and bis (4-isocyanateocyclohexyl) methane and a mixture of high and low molecular weight polyols.

* * * * *